Dec. 15, 1964 ÅKE BIRCH-IENSEN ETAL 3,161,480

DIELECTRICALLY HEATED DRYING APPARATUS THROUGH WHICH THE ARTICLES TO BE DRIED ARE CONTINUOUSLY ADVANCED

Filed Sept. 8, 1961 2 Sheets-Sheet 1

3,161,480

DIELECTRICALLY HEATED DRYING APPARATUS THROUGH WHICH THE ARTICLES TO BE DRIED ARE CONTINUOUSLY ADVANCED

Åke Birch-Iensen, Arlov, Sweden, and Harald Ekman, deceased, late of Goteborg, Sweden, by Gunda Ekman, administratrix, Goteborg, Sweden, assignors to Svenska Sockerfabriks Aktiebolaget, Malmo, Sweden, a company of Sweden Filed Sept. 8, 1961, Ser. No. 137,482

Claims priority, application Sweden, Sept. 12, 1960, 8,701/60

6 Claims. (Cl. 34—1)

This invention relates to a dielectrically heated drying apparatus through which the articles to be dried are continuously advanced and which comprises a high frequency generator and a pair of electrodes connected thereto, which form the output condenser of the high frequency generator and between which there is arranged a passage for the articles to be dried, one electrode being arranged as a conveyor for transporting the articles to be dried through said passage.

For economical reasons—high efficiency and simple construction—it is preferred to use in such drying apparatuses self-oscillating high frequency generators. By reason of electrical changes in the load circuit of the high frequency generator, caused for instance by variations in the electric properties of the articles to be dried which pass through the drying apparatus, there may arise, however, variations in the frequence of the high frequency generator of a size such that they cannot be accepted since they interfere with adjoining frequency bands.

One object of this invention is to provide an arrangement whereby such frequency variations are avoided and in connection therewith it is suggested according to the present invention to design, in a drying apparatus of the type referred to in the foregoing, the other electrode as a box-like member which is connected, with a firm inductive coupling, to the oscillating circuit, arranged as a resonator, of the high frequency generator and which by means of an external wall surface, together with said one electrode, defines the said passage for the articles to be dried, and to dispose one or more further electrodes having the same potential as said one electrode opposite to and spaced from one or more of the remaining external wall surfaces of the box-like electrode to form with said wall surface or wall surfaces a compensation condenser which is connected in parallel with the output condenser.

In the so designed drying apparatus the capacitance of the compensation condenser can be made large relative to that of the output condenser so that the reactive effect will be high in the load circuit of the high frequency generator. As a result thereof the variations in the electric properties of the advancing articles to be dried or the air between the electrodes of the output condenser have a considerably less influence on the tuning stability of the oscillating circuit, which is supported by the firm inductive coupling between the resonator oscillating circuit and the box-like electrode giving a certain band filter effect between the high frequency generator and its load circuit.

Another object of the invention is to provide in a dielectrically heated drying apparatus of the kind referred to an arrangement, whereby the moisture escaping at the dielectric drying of the articles is led away in an efficient and economical manner, thus overcoming the risk of moisture condensing on the electrodes.

A further object of the invention is to provide a dielectrically heated drying apparatus of the kind referred to including a high frequency generator which is of a mechanically robust and compact design.

The invention has been developed in connection with the design of a suitable apparatus for drying sugar cubes manufactured by vibration of sugar crystals in moulds and leaving the moulding machine in moist state regularly set up in transverse and longitudinal rows on a conveyor belt. The invention will therefore be more fully described in the following in connection with a drying apparatus for this particular purpose with reference to the accompanying drawings illustrating said apparatus by way of example only.

Figure 1:
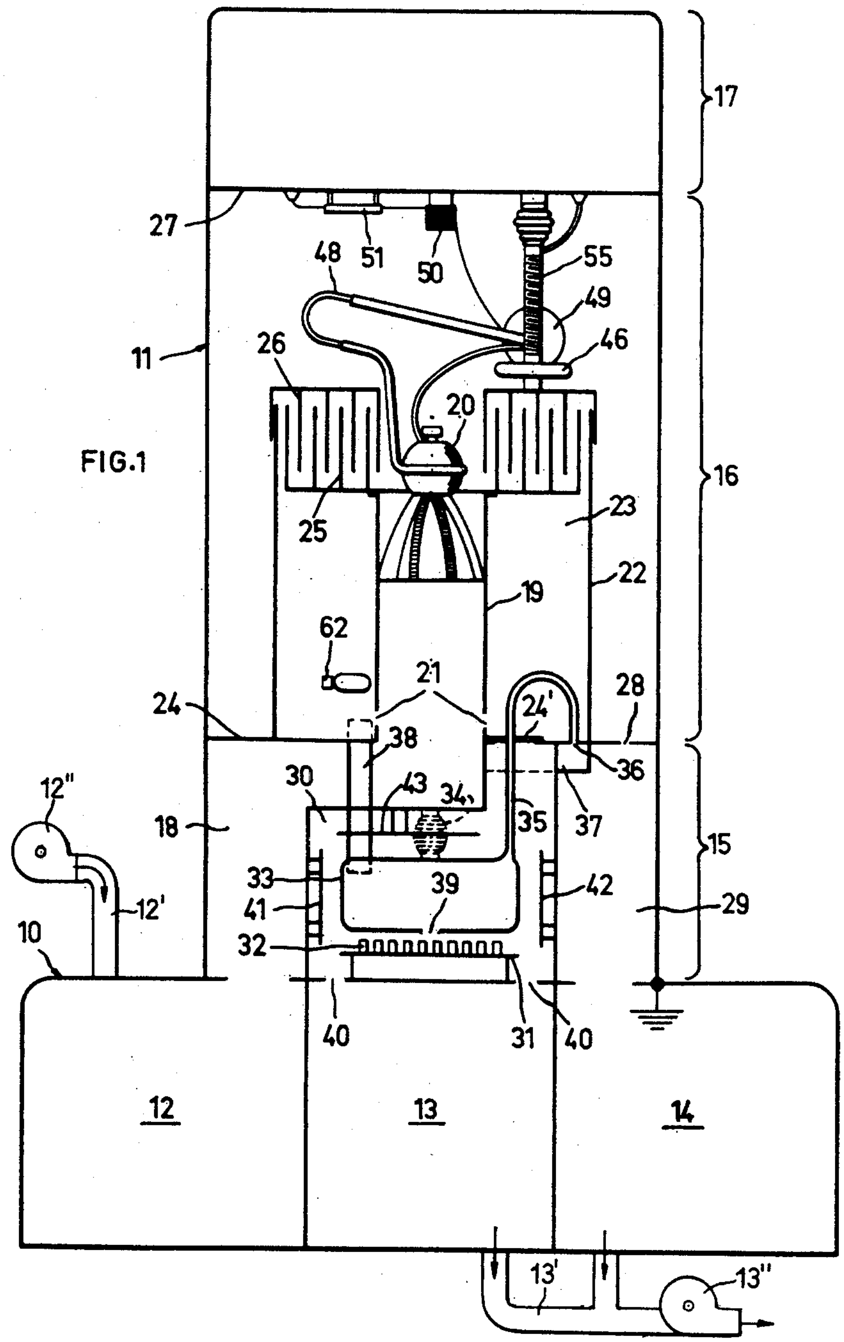
FIG. 1 is a diagrammatic vertical sectional view of the apparatus.

According to FIG. 1 of the drawings the drying apparatus comprises a sheet metal cabinet wholly enclosing the apparatus and consisting of a base 10 and a top 11. Arranged in the base 10 are three separate sets of ducting 12, 13 and 14, the ducting 12 being connected to a conduit 12' having a blower 12'' for feeding fresh air under pressure to the ducting, while ducting 13 and 14 are connected to a conduit 13' having a blower 13'' for sucking air from the respective ducting. The base 10 and the sets of ducting 12–14 arranged therein may extend throughout underneath several tops 11 belonging to individual drying apparatuses and erected in a row, forming separate units or being assembled with each other. The top 11 is divided into three superimposed sections 15, 16 and 17 of which the lowermost section 15 contains the drying oven proper, the intermediate section 16 contains the high frequency generator, and the uppermost section 17 contains elements pertaining to the current supply unit of the high frequency generator.

Through a conduit 18 in section 15 ducting 12 is in communication with the lower end of a cylindrical metal jacket 19 centrally and vertically disposed in section 16 and having mounted in its upper end an electron tube 20 by means of a complementary tube holder. Said electron tube 20 is arranged for air cooling and has anode cooling flanges located within cylinder jacket 19. Provided adjacent the lower end of said jacket are apertures 21 which connect the interior of cylinder jacket 19 to an annular space 23 formed between said jacket and a cylindrical metal jacket 22 surrounding it. At its lower end the annular space 23 is closed by a partition 24 separating sections 15 and 16 from each other. At the upper end of the annular space 23 is arranged a set of annular condenser plates 25 which are carried by cylinder jacket 19 and are electrically connected thereto, while a second set of annular condenser plates 26 is carried as a cover on cylinder jacket 22 and is electrically connected thereto, forming together with condenser plates 25 a condenser having air as dielectric. The annular space 23 is in communication through the interstices between the condenser plates with the space in section 16 outside cylinder jacket 22, which space at the upper end is closed by a partition 27 between sections 16 and 17 and at the lower end is in communication with ducting 14 through one or more apertures 28 and a conduit 29 in section 15. Air supplied to ducting 12 can thus pass through conduit 18 into the lower end of cylinder jacket 19 and thence on one hand past the cooling flanges of tube 20 outwards through the upper end of said cylinder jacket, and on the other hand through apertures 21, the annular space 23 and the condenser 25, 26 to the space in section 16 outside cylinder jacket 22 to escape therefrom through aperture 28, conduit 29 and ducting 14. All the air supplied through conduit 18 does not however take any of these two ways, for as will be described later other ways are also provided for the air escaping from section 16.

Provided in section 15 is an electrode chamber 30 through which passes an endless conveyor 31 in the shape of a steel belt. This conveyor arrives from a machine for manufacturing sugar cubes by vibration of sugar crystals in moulds and may extend through the electrode chambers in several consecutive drying apparatuses. The moist sugar cubes 32 leave the moulding machine regularly set up on the steel belt 31 in transverse and longitudinal rows and constitute the articles to be dried in the apparatus under continuous movement therethrough on said steel belt 31. Located above said belt 31 and spaced from the sugar cubes thereon is a box-like member 33 which is carried by the cabinet structure with the interposition of one or more insulators 34 and which is approximately of the same width as the steel belt 31 and extends along part of the length thereof in said cabinet 11. Steel belt 31 and member 33 constitute electrodes in an output condenser for the dielectric heating of the sugar cubes 32 passing through the gap between them and are electrically interconnected for this purpose in a manner to be described in the following. A metal pipe 35 extends from said box-like electrode 33 through an electrically insulating portion 24' of partition 24 upwards into space 23 where it is looped approximately semicircularly in order then to join partition 24, said pipe communicating through an aperture 36 in said partition and a conduit 37 with conduit 18 at the lower end of cylinder jacket 19. Pipe 35 thus constitutes a means for conveying part of the air arriving through conduit 18 to the interior of the box-like electrode 33 but, as will be shown in the following, it also provides a coupling element in the electric circuits of the high frequency generator and as such subjected to intense heating, thus requiring cooling in order not to be destroyed.

There are further means for introducing air into electrode 33, viz. one or more tubes 38 of some electrically insulating material, preferably polytetrafluoroethylene (Teflon), which connect the space in section 16 outside cylinder 22 with the interior of electrode 33 and thereby extend through conduit 18 and electrode chamber 30 without, however, communicating with the two last mentioned spaces. Provided in the wall of box-like electrode 33, which wall defines the gap between said electrode and steel belt 31, is a slot 39 for discharging the air introduced through pipe 35 and tube or tubes 38 into the interior of electrode 33 so that said air is directed towards the sugar cubes 32 on steel belt 31. Slot 39 extends along part of belt 31 slightly obliquely to the longitudinal direction of said belt and to the rows of sugar cubes extending in said direction. This will permit the air to be blown through slot 39 at a greater force than if the slot had extended exactly longitudinally of belt 31 without any risk for the sugar cubes being moved—while still moist and not appreciably adhering to steel belt 31—against the longitudinal edges of the belt by said air stream. The interior of the electrode chamber is in communication with ducting 13 through apertures 40 in the bottom of the electrode chamber.

The apparatus is provided with means to reduce in a simple manner the variations in the frequency which may occur in a self-oscillating high frequency generator as a consequence of changes in the electric properties of the dielectric in the air gap between electrodes 31 and 33. This dielectric is formed partly by air and partly by sugar cubes 32, and in these two media the dielectricity constant may be subject to variations, for instance by reason of varying moisture. For the purpose of eliminating or at least considerably reducing such changes of frequency condenser plates 41 and 42 are disposed in the apparatus here described on either side of the box-like electrode 33, and a condenser plate 43 above said electrode. These condenser plates are carried by the cabinet structure as is steel belt 31, and are electrically connected to said structure. They constitute together with electrode 33 a compensation condenser which—as will appear from the following—is connected in parallel with the output condenser formed by electrode 33 and steel belt 31. Preferably, at least one of condenser plates 41–43 is adjustable with respect to its distance to electrode 33. Suitably, it is the condenser plate 43 that is adjustable in this way.

In the apparatus thus arranged in point of mechanical design fresh air is supplied from ducting 12, the air passing through conduit 18 and thence on one hand through the interior of the cylinder jacket 19 to pass along the cooling flanges of pipe 20, and on the other hand through conduit 37 and pipe 35—which is thus cooled to the necessary extent—to the interior of electrode 33, and furthermore through apertures 21 and space 23 via condenser 25, 26 to the space in section 16 outside cylinder jacket 22. Hot and relatively dry air prevailing in said space escapes partly through aperture 28 and conduit 29 to ducting 14 to be discharged through it, and partly through tube or tubes 38 to the interior of box-like electrode 33. A greater or smaller part of the hot dry air discharged through ducting 14 can be admixed to the fresh air supplied to ducting 12 in order that the air supplied from ducting 12 to conduit 18 may have a constant temperature suitable for cooling the electron tube 20. As will have become apparent, hot air is supplied to the interior of box-like electrode 33 both through tubes 38 and through pipe 35 and consequently there is no risk that this electrode will be cooled down to such an extent that moisture can condense on its outer side during drying. At the same time the air streaming through electrode 33 prevents said electrode from being overheated by electrical loss heat. From electrode 33 the hot dry air flows outwards through slot 39 and is thereby supplied directly to the area from which moisture is to be carried away, i.e., the gap between electrodes 31 and 33 in the output condenser from where the supplied air carries along, through apertures 40, the moisture escaping from the sugar cubes by the heating thereof, whereupon the moist air is discharged through ducting 13. In this way a considerably more efficient discharge of escaping moisture is obtained than in case the air had been allowed to flow substantially in parallel with the plane of steel belt 31 from one end of electrode chamber 30 to the opposite end thereof.

Figure 2:
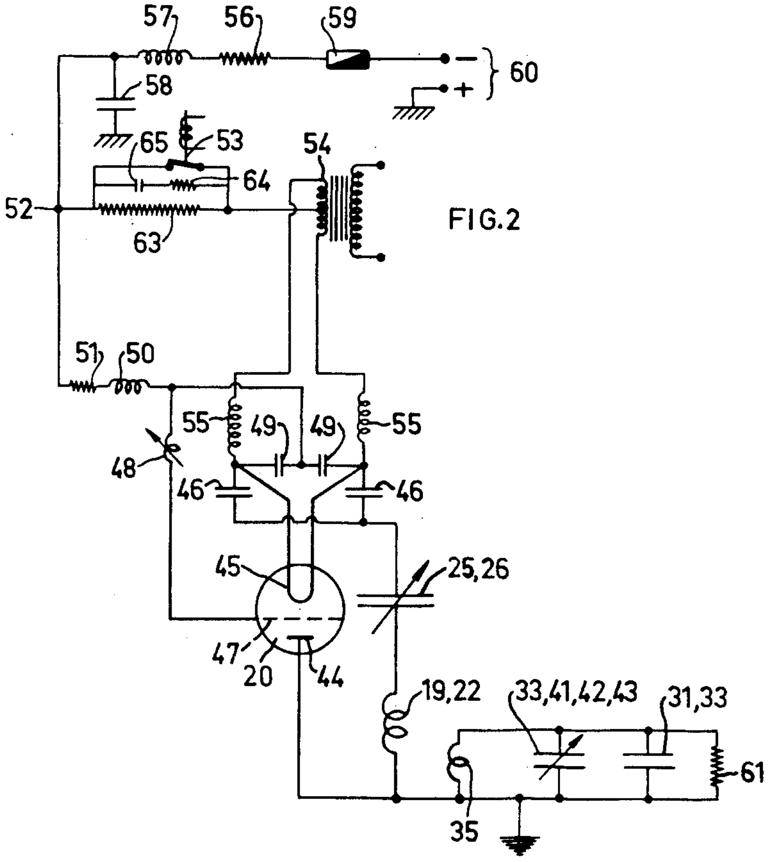
FIG. 2 is an electric wiring diagram for said apparatus.

The electric arrangements in the apparatus will now be described in more detail with reference also to Fig. 2 in the drawings. As will appear, the central portion of the high frequency generator, tube 20, is a triode the anode 44 of which is connected to earth. This earth connection has been established in that the cooling flanges of the tube which are mechanically and electrically connected to the anode are connected by means of the tube holder (not shown) to cylinder jacket 19 and through said jacket to the cabinet structure 10, 11 which is connected to earth in its entirety. Arranged between the directly heated cathode 45 of the tube and the anode 44 is a series-resonance circuit including an inductance formed by the two cylinder jackets 19 and 22, and a variable condenser formed by the annular condenser plate sets 25 and 26. This condenser may be variable for fine tuning of the anode circuit by the condenser plate sets 25 and 26 having apertures or notches and by the condenser plate set 26 disposed as a cover on the cylinder jacket 22 being rotatable relative to the condenser plate set 25 so that the apertures or notches in the condenser plate set 26 can be caused, by rotation of the cover, to more or less overlap the apertures or notches in condenser plate set 25. By suitably dimensioning said apertures or notches it will be possible thoroughly to control the capacitance of the condenser 25, 26 in this way.

Provided between said series-resonance circuit and cathode 45 are coupling condensers 46 which are also shown in FIG. 1. Grid 47 of tube 20 is connected to a tuned circuit arranged between said grid and cathode 45 and including a variable inductance 48 which according to FIG. 1 is formed by a slide-trombone-like device, and a pair of condensers 49 connected in parallel, which are also shown in FIG. 1. Thus tube 20 is coupled as an oscillator with a tuned anode circuit and a tuned grid circuit. Via a high frequency choke 50 and a grid leak 51 which are disposed according to FIG. 1 on the upper wall 27 of section 16, the grid circuit is connected to a point 52 to which there is applied in a manner to be described later a negative D.C. voltage and which is furthermore connected over a relay switch 53 which is closed at deenergized relay to the centre tap of the secondary 54 of a glow current transformer while the terminals thereof are connected to cathode 45 via high frequency chokes 55.

The glow current transformer 54 and the resistor 53 are disposed, in a manner not shown in detail, in the upper section 17 of the top 11 of the cabinet, which section can also accommodate a filter through which D.C. voltage is applied to point 52. According to FIG. 2 this filter includes a resistor 56, choke 57 connected in series therewith, and an earthing condenser 58. The filter is connected to the negative pole of a high voltage D.C. source 60 through a high voltage fuse 59. This source can be common to several drying apparatuses of the type described, and the filter serves to prevent that at a release of the fuse 59 for some of the apparatuses strong induction currents are produced in the remaining apparatuses connected to the high voltage source with a subsequent release of their fuses 59. The positive pole of the high voltage source is earthed as is the cabinet structure.

The output condenser formed by the box-like electrode 33 and steel belt 31 is firmly inductively coupled to the anode inductance 19, 22 of the high frequency generator by means of pipe 35 that is also arranged as a coupling loop, electrode 33 and electrodes 41, 42 and 43 constituting a compensation condenser connected in parallel with the output condenser and being variable provided that one of the condenser plates 41, 42 and 43 is adjustable with regard to its distance to electrode 33. The dielectric losses caused by the articles to be dried are represented in FIG. 2 by an equivalent resistor 61.

Should a flash-over occur in the gap between electrodes 31 and 33, a remaining arc is obtained in the apparatus described between the electrodes but on the other hand no increase of current through tube 20. This current will rather sink. Therefore, as it is not possible to protect the generator against such flash-over and subsequent remaining arc by disposing an over-load relay in the anode circuit, a particular safety circuit has been arranged. This consists of at least one photo cell 62 (FIG. 1) which is arranged in section 16 near the upper end of one of tubes 38, which is made from a light-conductive, preferably opaque material. The light from an arc in the electrode chamber 30 is transferred through the material of the tube 38 in question to the photo cell 62 which is adapted to close the circuit to the relay which opens so that a resistor 63 connected in parallel with the switch 53 of the relay is connected in the cathode circuit for cutting-off tube 20. To avoid the formation of an arc in the relay switch 53 when said switch is opened a filter circuit comprising a resistor 64 and a condenser 65 is connected over the relay contacts. In addition, the relay can be connected to means sensing overload in the anode circuit or overtemperature at some critical point in the high frequency unit so that also at overload or overtemperature the cathode resistor 63 is connected and tube 20 is thus driven to cut-off.

What we claim and desire to secure by Letters Patent is:

1. A dielectrically heated drying apparatus comprising a high frequency generator, the oscillation circuit of which is formed as a resonator, a box-like electrode having electrically conducting top, bottom and side walls, inductive coupling means providing a firm inductive coupling between said box-like electrode and said oscillating circuit, a conveyor spaced from the bottom wall of said box-like electrode and connected to said generator to form together with said bottom wall an output condenser for the generator, said conveyor being arranged for transporting articles to be dried through said output condenser between the electrodes thereof formed by said bottom wall and said conveyor, and means connected to have the same electric potential as said conveyor and disposed opposite at least one of the side walls of said electrode in spaced relationship thereto to form together with said one side wall a compensation condenser in parallel with said output condenser.

2. A dielectrically heated drying apparatus comprising a high frequency generator, the oscillation circuit of which is formed as a resonator, a box-like electrode having electrically conducting top, bottom and side walls, inductive coupling means providing a firm inductive coupling between said box-like electrode and said oscillating circuit, a conveyor spaced from the bottom wall of said box-like electrode and connected to said generator to form together with said bottom wall an output condenser for the generator, said conveyor being arranged for transporting articles to be dried through said output condenser between the electrodes thereof formed by said bottom wall and said conveyor, and adjustable means connected to have the same electric potential as said conveyor and disposed opposite at least one of the side walls of said box-like electrode in spaced relationship thereto to form together with said one side wall a variable compensation condenser in parallel with said output condenser.

3. A dielectrically heated drying apparatus comprising a high frequency generator, the oscillation circuit of which is formed as a resonator, a box-like electrode having electrically conducting top, bottom and side walls, inductive coupling means providing a firm inductive coupling between said box-like electrode and said oscillating circuit, a conveyor spaced from the bottom wall of said box-like electrode and connected to said generator to form together with said bottom wall an output condenser for the generator, said conveyor being arranged for transporting articles to be dried through said output condenser between the electrodes thereof formed by said bottom wall and said conveyor, means connected to have the same electric potential as said conveyor and disposed opposite at least one of the side walls of said electrode in spaced relationship thereto to form together with said one side wall a compensation condenser in parallel with said output condenser, means for feeding drying air into said box-like electrode, and means for discharging drying air from said box-like electrode through said side wall.

4. A dielectrically heated drying apparatus comprising a high frequency generator, the oscillation circuit of which is formed as a resonator, a box-like electrode having electrically conducting top, bottom and side walls, looped pipe means providing a firm inductive coupling between said box-like electrode and said oscillating circuit, a conveyor spaced from the bottom wall of said box-like electrode and connected to said generator to form together with said bottom wall an output condenser for the generator, said conveyor being arranged for transporting articles to be dried through said output condenser between the electrodes thereof formed by said bottom wall and said conveyor, means connected to have the same potential as said conveyor and disposed opposite at least one of the side walls of said electrode in spaced relationship thereto to form together with said side wall a compensation condenser in parallel with said output condenser, means for feeding drying air into said box-like electrode through said looped pipe means, and means for discharging drying air from said box-like electrode through said side wall.

5. A dielectrically heated drying apparatus comprising a high frequency generator, the oscillation circuit of which is formed as a resonator, a box-like electrode having electrically conducting top, bottom and side walls, inductive coupling means providing a firm inductive coupling between said box-like electrode and said oscillating circuit, a conveyor spaced from the bottom wall of said box-like electrode and connected to said generator to form together with said bottom wall an output condenser for the generator, said conveyor being arranged for transporting articles to be dried through said output condenser between the electrodes thereof formed by said bottom wall and said conveyor, means connected to have the same electric potential as said conveyor and disposed opposite at least one external wall surface of said electrode in spaced relationship thereto to form together with said side wall a compensation condenser in parallel with said output condenser, and means for feeding drying air into said box-like electrode, said electrode forming a slot opening in said side wall for discharging drying air from said box-like electrode through said side wall.

6. A dielectrically heated drying apparatus comprising a high frequency generator, the oscillation circuit of which is formed as a resonator, a box-like electrode having electrically conducting top, bottom and side walls, looped pipe means providing a firm inductive coupling between said box-like electrode and said oscillating circuit, a conveyor spaced from the bottom wall of said box-like electrode and connected to said generator to form together with said bottom wall an output condenser for the generator, said conveyor being arranged for transporting articles to be dried through said output condenser between the electrodes thereof formed by said bottom wall and said conveyor, adjustable means connected to have the same electric potential as said conveyor and disposed opposite at least one of the side walls of said box-like electrode in spaced relationship thereto to form together with said side wall a variable compensation condenser in parallel with said output condenser, and means for feeding drying air into said box-like electrode through said looped pipe means, said electrode having a slot opening in said bottom wall for discharging drying air from said box-like electrode through said side wall.

References Cited by the Examiner

UNITED STATES PATENTS

| | | | |
|---|---|---|---|
| 2,428,615 | 10/47 | Brown | 219—10.9 X |
| 2,546,004 | 3/51 | Kinn | 34—1 X |
| 2,674,050 | 4/54 | Pound | 34—1 |
| 2,698,488 | 1/55 | Cannon | 34—1 |
| 2,865,790 | 12/58 | Baer | 34—1 X |

NORMAN YUDKOFF, *Primary Examiner.*